United States Patent [19]
Hornyak

[11] 3,740,094
[45] June 19, 1973

[54] VARIABLE POSITION SEAT BELT BUCKLE HOLDER
[76] Inventor: Robert J. Hornyak, 144 Everett, Toledo, Ohio 43608
[22] Filed: Dec. 14, 1970
[21] Appl. No.: 97,548

[52] U.S. Cl. .............................. 297/385, 297/389
[51] Int. Cl. ............................................. A47c 31/00
[58] Field of Search ................. 277/188, 385, 386, 277/387, 388, 389; 280/150; 24/201, 201 B, 73 MF, 23 U

[56] References Cited
UNITED STATES PATENTS
3,312,502  4/1967  Coe................................ 24/230 A X
3,522,923  8/1970  Charpentier..................... 248/206 A FOREIGN PATENTS OR APPLICATIONS
480,964  12/1969  Switzerland..................... 24/201 B Primary Examiner—Bobby R. Gay
Assistant Examiner—Glenn O. Finch
Attorney—George R. Royer

[57] ABSTRACT

A variable position holder for seatbelt buckles comprised of magnetic members placed in a series position on the holder panel for placing and securing the seatbelt buckles thereon while not being used.

2 Claims, 3 Drawing Figures

PATENTED JUN 19 1973   3,740,094

INVENTOR.
ROBERT J. HORNYAK

VARIABLE POSITION SEAT BELT BUCKLE HOLDER

BACKGROUND OF THE INVENTION

This invention is a holder for seatbelt buckles and specifically male or female ends of the buckles when not being used. The holder has adjustable and variable holding positions for the respective seatbelt buckle. Seatbelt buckles which lay around the seat whenever they are not being used leads to a matter of inconvenience and disarray in the car and often this situation discourages their use. Several inventions have been devised to provide for holding and securing seatbelt buckles while not being used. Several such inventions have magnetic members thereon for retaining metallic buckles but none are adapted to for the problem of variable belt lengths which are pulled out so as to hold the belts in a relatively taut position whenever the belts are fastened to the seat.

In view of these problems in the prior art, it is an object of this invention to provide an improved seatbelt buckle holder:

It is also an object of this invention to provide a variable positional seatbelt buckle holder:

It is also an object of this invention to provide a safe and secure seatbelt receptable system.

Other and further objects will be obvious from the following description and the accompanying drawings, in which FIG. 1 is a top elevational view of the subject invention.

Figure 2:
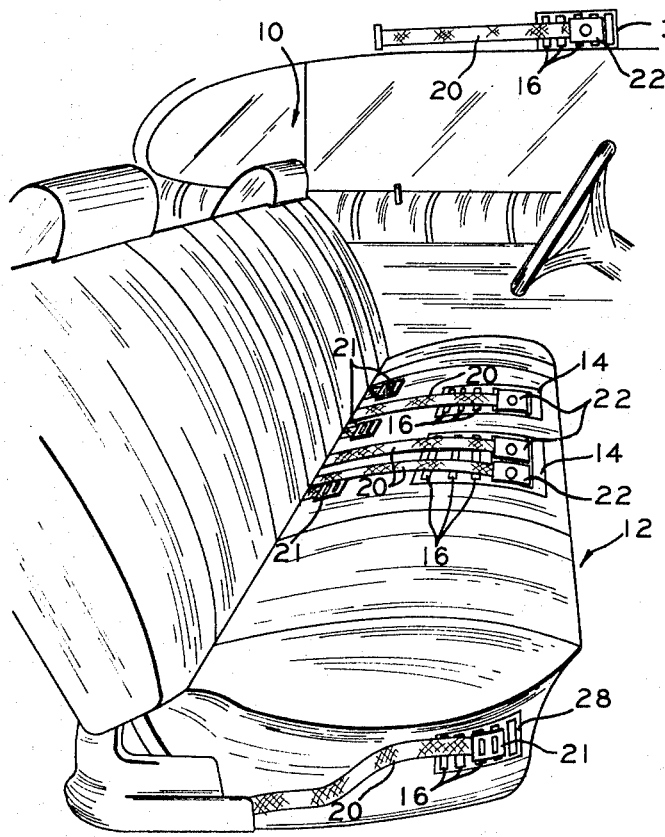
FIG. 2 is a perspective view of a car seat having the subject invention thereon.
Figure 1:
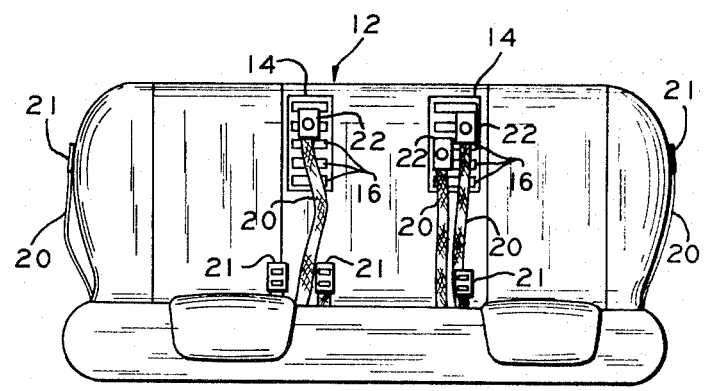

In general, the invention is a semipermanent or permanent panel attachment to be placed on the seats semipermanently or integrally in the seats. This panel attachment has a plurality of magnets thereon arranged in series fashion on which magnets the individual seatbelt buckles can be placed.

Referring to the drawings in which a preferred embodiment is shown, the interior of an automobile 10 is shown in which a conventional front seat is represented by 12. The front seat 12 is constructed to normally accomodate two passengers, however, this invention could be readily adapted to three passenger seats. In addition, the principles of the invention would apply to rear seats, as well.

Figure 3:
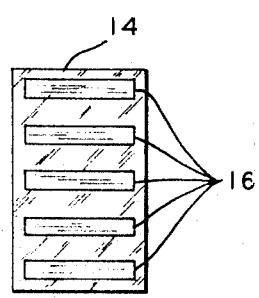
FIG. 3 is a top elevational view of the holding panel for the magnetic members.

A pair of panels 14 of longitudinal disposition, are adapted to be fitted on the top of seat 12 or integrally into the fabric of seat 12. Each panel 14 has attached thereon a plurality of rectangular magnetic blocks 16 situated in a row in series fashion as shown in FIG. 3. Each panel 14 is preferably made of a cloth or leather material onto which the magnets 16 are affixed or otherwise integrally attached. The panel 14 is then cohesively or integrally adhered to the seat for a semipermanent attachment, or it can be sewn to seat 12 for a permanent attachment as in new cars.

A series of pairs of seatbelts 20 with metallic buckles 21 are situated about seat 12 for safety purposes, and these seatbelt buckles 21 are adapted to be magnetically attracted to the magnetic blocks 16. These magnetic blocks 16 are placed on panel 14 such that a belt buckle 21 can be moved to and fastened on any one of the magnetic blocks in a position depending on how far extended the seat belt buckle was on the seatbelt. By this arrangement there is provided a variable seatbelt buckle holder, i.e., a holder with multiple positions thereon to be used as dictated by the extended length of the seatbelt. While in this magnetically attracted position the belts will be held rather securely.

By this latter arrangement, the inner seatbelt buckles could be secured. Relative to the outer seatbelt buckles, a panel 28 is attached to the side of seat 12. Panel 28 has a plurality of magnetic blocks 16 therein, and is attached to seat 12 in a manner similar to panel 14.

As to the shoulder belts, a magnetic holder 30 on the side of the inner roof of car 10 could be provided. The panel 30 is fastened to seat roof by an adhesive substance or sewn thereto.

The above description shall not be construed to limit the scope of the invention as set forth in the following claims:

What is claimed is:

1. A seatbelt buckle holder disposed on an automobile seat to hold the inboard metallic seatbelt buckles, comprising in combination:
   a. a rectangularly-shaped panel member integrally attached to the upper surface of the automobile seat;
   b. a plurality of rectangularly-shaped magnetic members disposed on said panel in a series fashion with the longitudinal axis of said series of magnetic members being parallel to the longitudinal axis of said automobile, said magnetic members being adapted to attract and hold a metallic seat belt buckle.

2. A seatbelt buckle holder as described in claim 1 in which the magnetic members are disposed in a direction perpendicular to the central longitudinal axis of the automobile.

* * * * *